(12) United States Patent
Müller et al.

(10) Patent No.: US 10,341,902 B2
(45) Date of Patent: Jul. 2, 2019

(54) METHOD AND SYSTEM RELATING TO HANDOVER

(71) Applicant: Telefonaktiebolaget LM Ericsson (publ), Stockholm (SE)

(72) Inventors: Walter Müller, Upplands Väsby (SE); Leo Hedlund, Älvsjö (SE); Mikael Jonsson, Vällingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/542,271

(22) PCT Filed: Jan. 15, 2015

(86) PCT No.: PCT/SE2015/050030
§ 371 (c)(1),
(2) Date: Jul. 7, 2017

(87) PCT Pub. No.: WO2016/114694
PCT Pub. Date: Jul. 21, 2016

(65) Prior Publication Data
US 2017/0367012 A1    Dec. 21, 2017

(51) Int. Cl.
| | | |
|---|---|---|
| *H04W 4/00* | (2018.01) |
| *H04W 36/00* | (2009.01) |
| *H04W 52/32* | (2009.01) |
| *H04W 52/40* | (2009.01) |
| *H04W 72/04* | (2009.01) |
| *H04W 36/30* | (2009.01) |
| *H04W 36/08* | (2009.01) |

(52) U.S. Cl.
CPC ....... *H04W 36/0005* (2013.01); *H04W 36/30* (2013.01); *H04W 52/325* (2013.01); *H04W 52/40* (2013.01); *H04W 72/0473* (2013.01); *H04W 36/08* (2013.01)

(58) Field of Classification Search
None
See application file for complete search history.

(56) References Cited

U.S. PATENT DOCUMENTS

| | | | |
|---|---|---|---|
| 2012/0026985 A1 | 2/2012 | Ren et al. | |
| 2013/0136027 A1* | 5/2013 | Matsuo | H04W 24/10 370/252 |
| 2014/0105187 A1* | 4/2014 | Das | H04W 28/22 370/336 |
| 2014/0269623 A1 | 9/2014 | Sadek et al. | |

FOREIGN PATENT DOCUMENTS

| | | |
|---|---|---|
| EP | 264591 A1 | 10/2013 |
| EP | 2768266 A1 | 8/2015 |
| WO | 2010002692 A1 | 1/2010 |
| WO | 2014121841 A1 | 8/2014 |

* cited by examiner

*Primary Examiner* — Zewdu A Beyen
(74) *Attorney, Agent, or Firm* — Sage Patent Group

(57) ABSTRACT

The present disclosure relates to a method (30) relating to handover in a communication system (1). The method (30) comprises establishing (31) that a communication device (3) is involved in a handover process from a first cell (C1) to a second cell (C2); and increasing (33) transmission power of a scheduling assignment specific for the communication device (3). The disclosure also relates to a system, computer program and computer program products.

11 Claims, 6 Drawing Sheets

METHOD AND SYSTEM RELATING TO HANDOVER

TECHNICAL FIELD

The technology disclosed herein relates generally to the field of wireless communication networks and in particular to handover procedures in such networks.

BACKGROUND

Long Term Evolution (LTE) is a radio access technology standardized by 3rd Generation Partnership Project (3GPP). LTE only supports a Packet Switched (PS) domain and is intended to eventually provide all services in the packet switched domain. LTE has no Circuit Switched (CS) domain in contrast to previous 3GPP systems, and circuit switched voice calls are therefore still supported by 2G and 3G networks on behalf of the LTE network. A user with an LTE-subscription that is making or receiving a voice call is hence redirected to the 2G or 3G network. Voice over LTE (VoLTE) is an Internet Protocol (IP) Multimedia Subsystem (IMS)-based specification intended for providing speech services over the packet switched domain.

To secure a successful roll out of speech services over LTE, superior performance, both with respect to integrity and retainability, is expected and regarded a corner stone. Naturally, operators as well as end users will have the same high quality expectations on VoLTE as they have on speech services in the 2G and 3G networks, e.g. Global System for Mobile Communications (GSM) and Wideband Code Division Multiple Access (WCDMA).

It has been observed that the handover procedure in LTE radio access networks is vulnerable to interference, i.e. when the interference in the radio access network increases the handover performance degrades. A handover failure resulting in a dropped call is a source of user dissatisfaction and it is therefore important to have a very high handover success rate. To meet the performance expectations of the LTE users, there is a need for solutions which increases handover robustness in LTE.

SUMMARY

An objective of the present disclosure is to solve or at least alleviate the above mentioned problem.

The objective is according to a first aspect achieved by a method relating to handover in a communication system. The method comprises establishing that a communication device is involved in a handover process from a first cell to a second cell, and increasing transmission power of a scheduling assignment specific for the communication device.

The method provides an improved robustness for scheduling assignments, in particular handover-related scheduling assignments, in an interference limited part of a radio access network, and also in a coverage limited part of the radio access network. The method thus ensures robustness in handover in high-interference environments as well as in areas having limited coverage. The method further provides the improved handover robustness with retained overall system capacity and in a highly resource efficient way, by increasing the transmission power only for some specific time/frequency resources at some particular occasions.

The objective is according to a second aspect achieved by a computer program for a communication system for handover in a communication system. The computer program comprises computer program code, which, when executed on at least one processor of the communication system causes the communication system to perform the method as above.

The objective is according to a third aspect achieved by a computer program product comprising a computer program as above and a computer readable means on which the computer program is stored.

The objective is according to a fourth aspect achieved by a communication system configured to establish that a communication device is involved in a handover process from a first cell to a second cell, and to increase transmission power of a scheduling assignment specific for the communication device.

The objective is according to a fifth aspect achieved by a communication system comprising means for establishing that a communication device is involved in a handover process from a first cell to a second cell, and means to increase transmission power of a scheduling assignment specific for the communication device.

Further objectives, features and advantages of the present disclosure will become clear upon reading the following description and the accompanying drawings.

DETAILED DESCRIPTION

Figure 1:
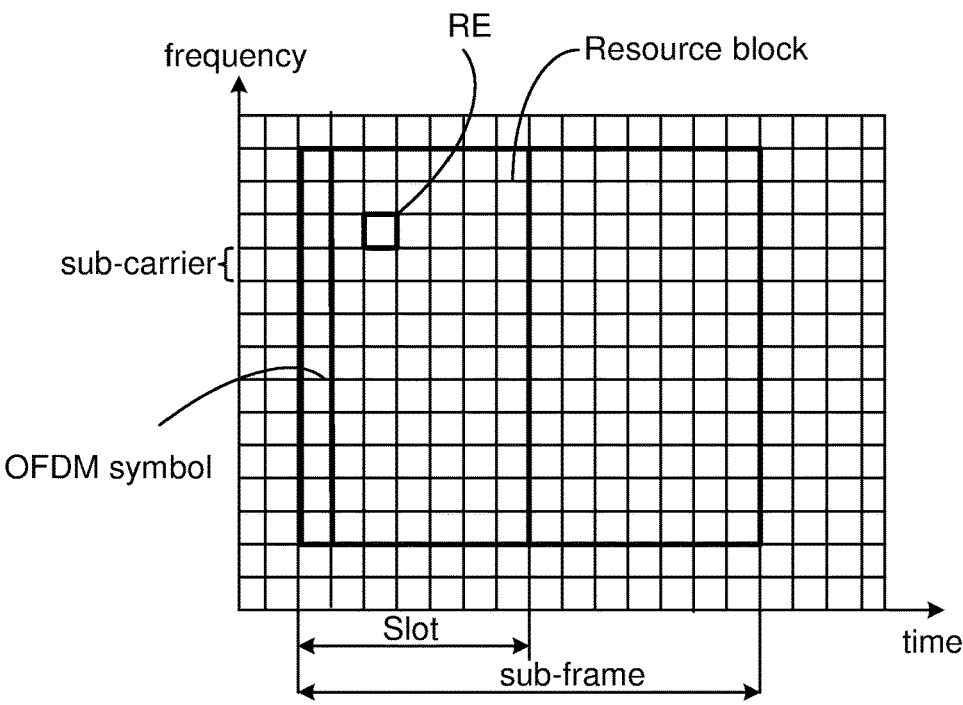
FIG. 1 illustrates an OFDM resource grid.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

As mentioned in the background section, it is important to ensure a reliable roll out of voice services over LTE, since more and more speech traffic will be migrated from older technologies. In order to keep user satisfaction during this shift in technology, voice services over LTE must be at least as good as in previous generations of mobile systems, both with respect to speech quality and retainability. The teachings of the present disclosure address in particular the latter area. Retainability it is monitored very closely by operators of today, and handover success rate is one of the most important key performance indicators (KPIs) in this context. Nothing less than top performance is accepted, and the teachings of the present disclosure facilitates in obtaining this. In addition, the present teachings introduce increased handover robustness in an efficient way. In particular, the robustness is increased in an efficient way by increasing transmission power only during the most critical parts of the connection handover, which implies minimal impact on system capacity.

In order to provide a comprehensive understanding of the present disclosure, some basics of LTE is provided in the following, with reference to FIGS. 1-3. The LTE standard is based on Orthogonal Frequency Division Multiplexing (OFDM) in the downlink and Single Carrier-Frequency Division Multiple Access (SC-FDMA) in the uplink.

FIG. 1 illustrates the structure of the OFDM resources. In the time domain (horizontal axis), one sub-frame comprises two slots, and each slot in turn comprises seven OFDM symbols. One resource block comprises twelve sub-carriers in the frequency domain (vertical axis) and one slot in the time domain, which gives 84 (12×7) resource elements (RE) in each resource block. A scheduling block comprising 14 OFDM symbols, i.e. one sub-frame, is the smallest resource unit that can be allocated to a UE.

Figure 2:
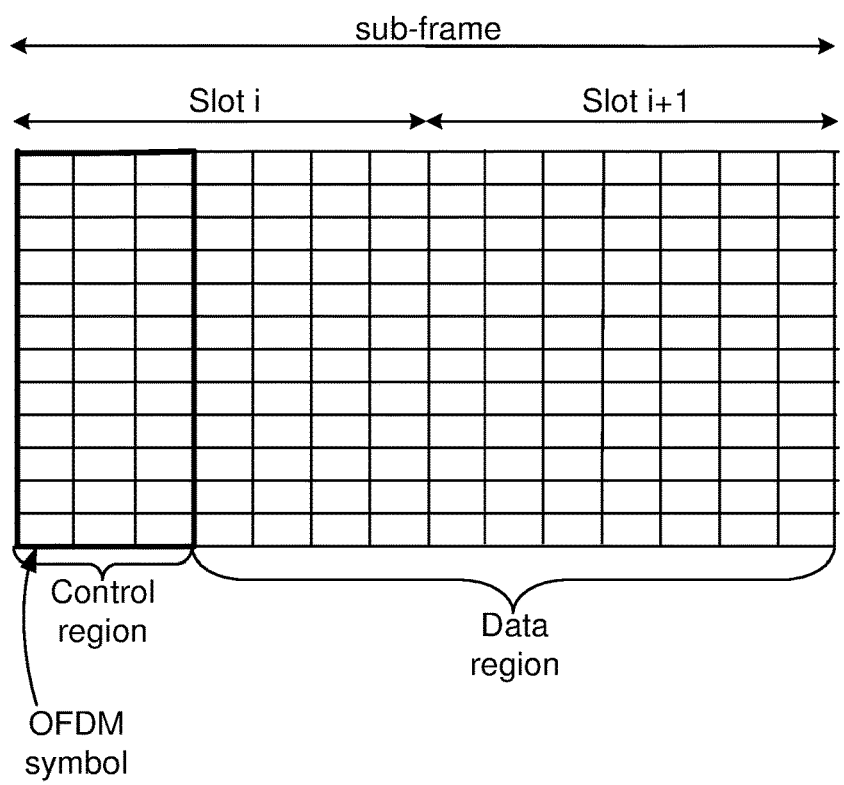
FIG. 2 illustrates a control region of an OFDM sub-frame.

FIG. 2 illustrates a control region and a data region of a sub-frame. In LTE, no dedicated data channels are used; instead shared channel resources are used in both downlink and uplink. These shared resources are each controlled by a scheduler that assigns different parts of the downlink and uplink shared channels to different user equipment (UEs) for reception and transmission respectively. Physical Downlink Control Channel (PDCCH) is a channel that carries a message called Downlink Control Information (DCI) which comprises resource assignments ("pointers") for one UE or a group of UEs. The DCI messages carries information about resource scheduling for uplink and downlink, transmit power commands, type of modulation used etc. Multiple PDCCHs may be transmitted in a single subframe which may or may not be all relevant to a particular UE. Each assignment, i.e. each "pointer" to a particular set of REs where the data is actually sent, is thus transmitted on the PDCCH in the control region. As mentioned, there may typically be multiple PDCCHs in each subframe and the UEs will be required to monitor the PDCCHs to be able to detect the assignments directed to them and in that way being able to "find" the set of REs comprising the data directed to them (data waiting for it on the PDSCH) or if it has been allocated specific resources on the physical uplink shared channel (PUSCH).

The assignment information for the data on the shared channels is transmitted in the control region covering a few OFDM symbols in the beginning of each downlink subframe. This control region, which is indicated in FIG. 2, may comprise up to three OFDM symbols (or up to four OFDM symbols in case of 1.4 MHz system bandwidth) in the first slot of each downlink subframe, which comprises two slots (denoted Slot i and Slot i+1 in the figure). Data is transmitted in a data region covering the rest of the OFDM symbols in the subframe. The size of the control region is one, two, or three OFDM symbols (or in the indicated case four OFDM symbols) and is set per subframe. The size is signaled as a specific control format indicator (CFI) to the UE for each subframe on the so called Physical CFI Channel (PCFICH).

Figure 3:
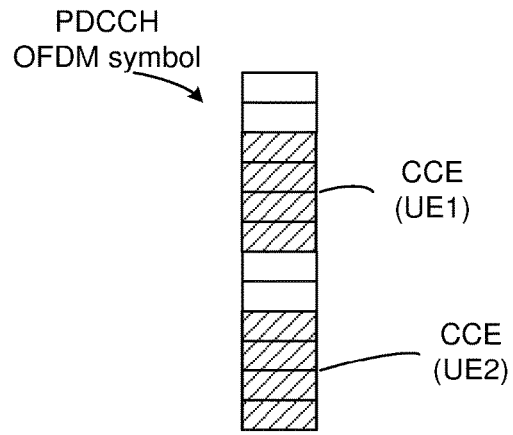
FIG. 3 illustrates the PDCCH of LTE.

FIG. 3 illustrates an exemplary PDCCH OFDM symbol of LTE. The scheduling assignments and other control information of the PDCCH are mapped to Control Channel Elements (CCEs), which are mapped to the physical resource elements (REs). The scheduling assignment of each UE may be interleaved in 1, 2, 4 or 8 consecutive CCEs; the CCE aggregation level is said to be 1, 2, 4 or 8. In the example illustrated in FIG. 3, scheduling assignments for a first UE (UE1) and a second UE (UE2) are illustrated as provided in a respective set of 4 consecutive CCEs. The UE finds the particular PDCCH that is specific to it by monitoring a set of PDCCH candidates, which is a set of CCEs on which a PDCCH could be mapped, in every subframe.

In view of handover, it has been identified during field activities that it is the Scheduling Assignment to the Handover Command via the PDCCH that has shown to be a weak spot. If the UE fails to receive the scheduling assignment, then it will not make the handover and it will most likely loose its connection. Failed handovers and as a consequence loss of connection, create great dissatisfaction among the users.

Briefly, the present disclosure provides, in various embodiments, a method for making handover related Scheduling Assignments on the PDCCH more robust towards interference by increasing the PDCCH power for certain subframes for UEs involved in handover. This can be achieved by utilizing information already available in the wireless communication network, e.g. in a node such as an evolved Node B (eNodeB) thereof. The method strengthens the handover performance not only in an interference limited part of the wireless communication network, but also in areas suffering from bad coverage.

Figure 4:
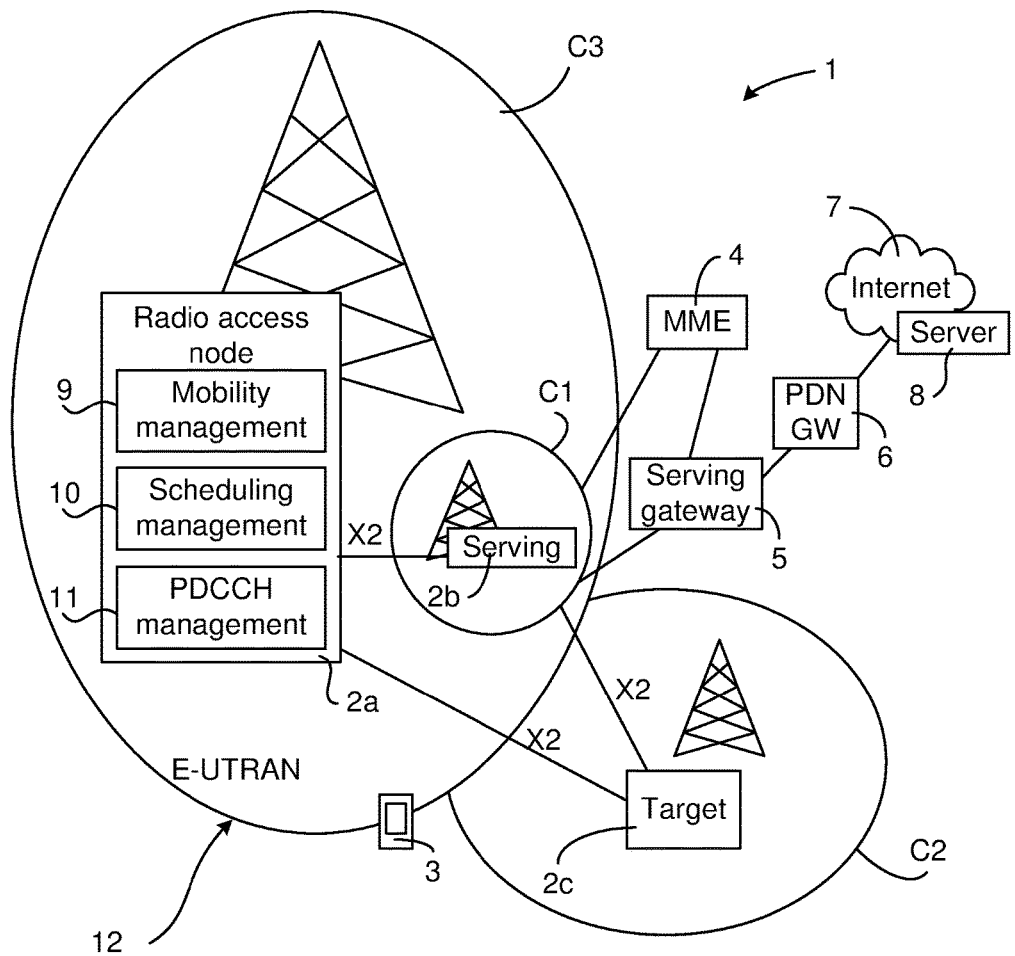
FIG. 4 illustrates schematically a communication system in which embodiments of the present disclosure may be implemented.

FIG. 4 illustrates schematically a communication system in which embodiments of the present disclosure may be implemented. The communication system 1 comprises a radio access network 12, illustrated in the figure as implementing Evolved Universal Terrestrial Radio Access Network (E-UTRAN). The radio access network 12 comprises a number of radio access nodes 2a, 2b, 2c, which are interconnected with each other, and able to exchange communication e.g. over an X2 interface.

The radio access nodes 2a, 2b, 2c provide wireless communication to a number of communication devices 3, each radio access node 2a, 2b, 2c providing communication coverage in one or more geographical areas (typically denoted cells). In the FIG. 4, three such cells are indicated: a first cell C1 controlled by a first radio access node 2b, a second cell C2 controlled by a second radio access node 2c and a third cell C3 controlled by a third radio access node 2a. It is noted that one of the radio access nodes could control several cells, e.g. in another configuration, the third radio access node 2a could control e.g. both the first cell C1 and the third cell C3. In the following the radio access nodes 2a, 2b, 2c are exemplified by eNodeBs. Handover may be performed between cells allocated to the same eNodeB (intra eNodeB handover) or between cells allocated to different eNodeBs (inter eNodeB handover). In the following, inter eNodeB is used as example, but it is noted that the present teachings may be used for intra eNodeB handover as well. The eNodeB 2a, 2b, 2c may be a serving eNodeB for some communication devices 3 and a target node for others. A serving eNodeB handles the connection for a communication device 3, and a candidate eNodeB is a node to which a communication device 3 may be handed over from another eNodeB. In the FIG. 4, a first eNodeB 2b is indicated as being the serving eNodeB for the communication device 3, while a second eNodeB 2c is a target eNodeB for this communication device 3. Once the communication device 3 has a, in some sense, better connection to the target eNodeB 2c, then a handover is made to this eNodeB 2c, which thus becomes the serving eNodeB for the communication device 3.

The communication devices 3 may comprise any type of device able to communicate wirelessly with the eNodeB, examples of which comprise smart phones, laptops, tablet computers etc. The communication device 3 is in the following also denoted user equipment (UE).

The communication system 1 comprises a core network comprising nodes such as Mobility Management Entity (MME) 4 and serving gateway 5 and packet data network gateway (PDN-GW) 6. The PDN-GW 6 provides connectivity to external packet data networks, e.g. a cluster of servers, which is sometimes referred to as a "cloud". One server of such cluster of servers (such as the Internet 7) is indicated at reference numeral 8.

FIG. 4 also indicates logical parts of the eNodeB 2a, 2b, 2c that may be used according to various embodiments of the present disclosure. In particular, a mobility management 9, a scheduling management 10 and a PDCCH management 11 are illustrated.

The mobility management 9 has information about each UE, in particular whether or not a UE 3 is involved in a handover or not. This information for each UE 3 is known by the serving eNodeB 2b and by a prepared target eNodeB 2c. A target eNodeB 2c may e.g. be prepared for a handover by receiving a handover request message from the serving (source) eNodeB 2b. The scheduling management 10 comprises information regarding what to be scheduled for an UE 3 in the next transmission time interval (TTI), e.g. whether a signaling radio bearer (SRB) or a data radio bearer (DRB) is to be scheduled. The TTI (one sub-frame) is the smallest time unit in which an uplink or downlink transmission can be scheduled.

The PDCCH management 11 comprises a functionality to set the transmission power of PDCCH.

Figure 5:
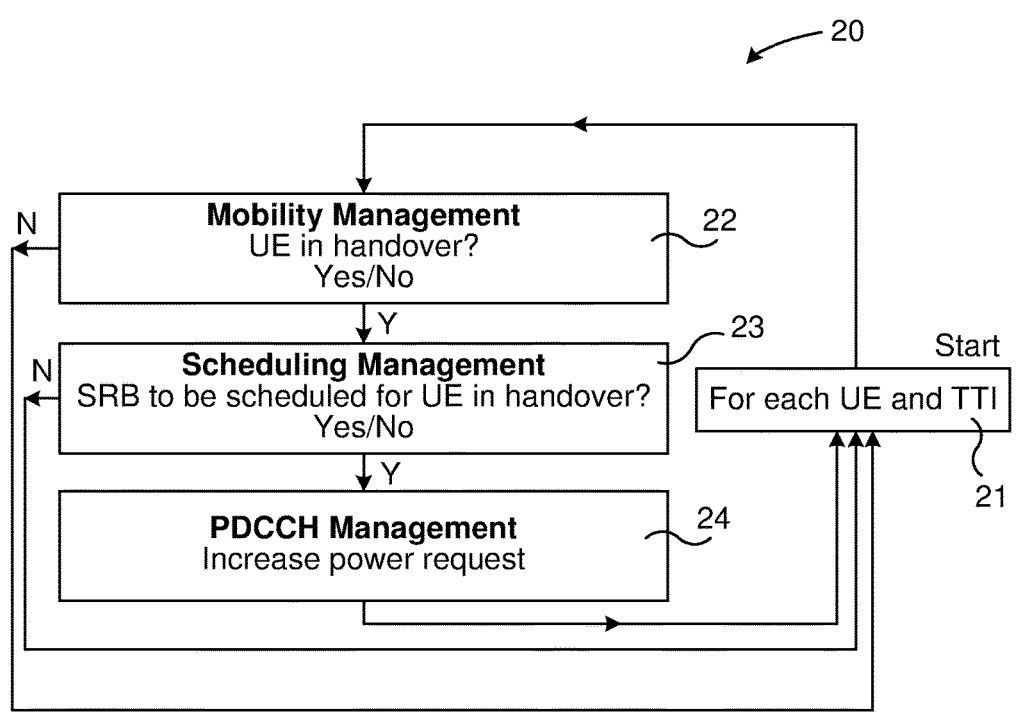
FIG. 5 is a flow chart of an embodiment of the present disclosure.

FIG. 5 is a flow chart of an embodiment of the present disclosure, and also indicates an interaction between the above described logical parts 9, 10, 11. All information required for implementing various embodiments of the present disclosure is hence available in the eNodeB 2a, 2b, 2c. The different pieces of information may be combined in different ways to achieve the improved way of sending handover related scheduling assignments, which is described next.

Various embodiments can be implemented by combining the information of the mobility management 9, the scheduling management 10 in different ways and also with different level of precision.

The flow 20 starts in box 21. For each UE 3 and each TTI it is first determined (in box 22) if the UE 3 is involved in a handover process or not. This information is available in the Mobility Management 9. In one embodiment, only this information is used and transmission power is increased for all scheduling assignments to the particular UE 3 being established to be in a handover process.

If the UE 3 is not involved in a handover process, flow returns to box 21, where it is again determined, for the next TTI, if the UE is involved in a handover process.

If the UE 3 is in a handover process flow continues to box 23, in which it may be determined if an SRB and/or a DRB is to be scheduled for the UE 3. The Scheduling Management 10 comprises information on whether an SRB or a DRB is to be scheduled for a certain UE. In various embodiments, the information that the UE 3 is in a handover process may be combined with information in the scheduling management 10, e.g. increasing transmission power for scheduling assignments for the UE 3 for all SRB scheduling assignments.

If no SRB is scheduled for the UE 3 in this TTI, then flow may again return to box 21.

If there is an SRB scheduled for the UE 3, then flow may continue to box 24, wherein transmission power for the PDDCH for this particular UE 3 may be increased.

In the PDDCH management 11, various options are available as mentioned. A transmission power increase may be applied for all Scheduling Assignments to the UE 3 involved in a handover process. Alternatively, a transmission power increase may be applied for all SRB Scheduling Assignments for the UE 3. Still another alternative is to combine information regarding "UE in handover process" and "SRB to be scheduled" and only apply the increased transmission power to the Scheduling Assignments when both criteria are met. This is a more resource efficient option, compared to the two first mentioned alternatives. The number of PDCCH resources required to provide a scheduling grant to a UE depends on the radio conditions of the particular UE: a UE having poor radio conditions, e.g. due to being located in a coverage limited area, will require a higher number of PDCCH resources. For instance, if the UE is located at cell edge, it may require 8 CCEs (CCE aggregation level 8). By increasing the transmission power on scheduling assignments for the UE that is in a handover process and having SRBs to be scheduled, the chances of a successful handover is increased. Further, the risk of needing to retransmit the PDDCH to the UE is reduced, thus saving resources. Further, by increasing the transmission power only on certain scheduling assignments, in particular scheduling assignments relating to handover, increase in created interference is also limited.

For each UE 3, information regarding Handover and bearer type (SRB/DRB) may be combined and increased power may be requested only for e.g. Scheduling Assignments from PDCCH Management 11 in the case that the UE 3 is in a handover process and if, at the same time, an SRB is to be scheduled. Various embodiments for this transmission power increase are described also with reference to FIG. 7.

It is noted that the power increase may be used for other bearers as well, besides the SRB/DRB. Two examples of such other bearers comprise VoLTE bearers and VoLTE IMS control bearers. It is also noted that the increased power that is used by the currently serving eNodeB 2b for specific resources may be continued to be used by the target eNodeB 2c after the handover has been completed.

Figure 6:
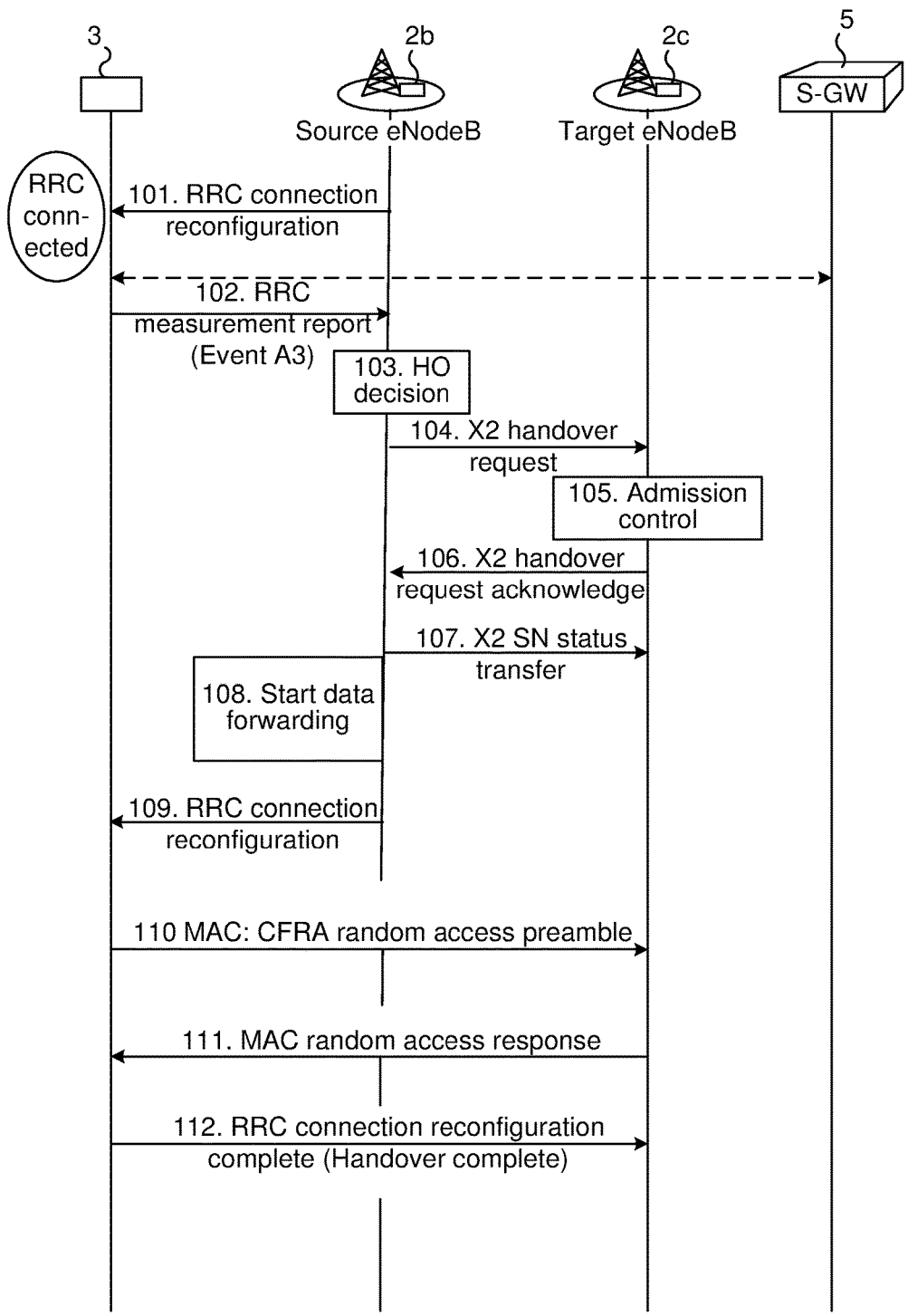
FIG. 6 is a signaling sequence of a handover procedure.

FIG. 6 is a signaling sequence of a handover procedure. It is noted that additional signaling, not illustrated in the figure, between the different nodes and UE may occur. It is again noted that the inter eNodeB handover case is used for describing different embodiments of the present disclosure, but that the teachings are applicable also for intra eNodeB handover.

At arrow indicated at reference numeral 101, the source eNodeB 2b sends a radio resource configuration (RRC) connection reconfiguration message to the UE 3, comprising bearer setup to the serving gateway 5 (indicated by double-headed arrow drawn with dashed line), measurement configurations etc. The UE 3 is then RRC connected.

At arrow indicated at reference numeral 102 the actual handover procedure begins, by the UE 3 sending an RRC measurement report to the source eNodeB 2b, i.e. to its serving eNodeB. This sending of the RRC measurement report may for instance be triggered by an Event A3 being fulfilled. Event A3 is a measurement report triggering event in LTE, wherein the UE 3 has measured that a neighboring eNodeB cell (also denoted target cell or neighboring cell here) has become a certain offset better than the serving eNodeB cell (or serving cell for short). In particular, the event A3 will trigger when the reference signal received power (RSRP) of reference signal from the neighboring cell is, for instance, 2 dB stronger that the RSRP of the currently serving cell. It is noted that other measurement events could alternatively be used, e.g. event A4, which triggers a measurement report to be sent by the UE 3 when the neighbor cell becomes better than an absolute threshold. It is also noted that the mentioning of 2 dB is provided purely as an example and that this is a configurable parameter which can alternatively be set to other values.

Further examples of events that could be used comprise, but are not restricted to, event A5, wherein serving cell becomes worse than a first threshold and neighbor cell becomes better than a second threshold, which is often used for inter frequency handover; and event B2, wherein serving cell becomes worse than a first threshold and inter radio access technology (RAT) neighbor cell becomes better than a second threshold, which is an event often used for inter-RAT handover.

In box indicated at reference numeral 103, a handover decision is made in the source eNodeB 2b. The decision on whether or not a handover is to be made for the UE 3 is made in response to the reception of the RRC measurement report.

At arrow indicated at reference numeral 104, the source eNodeB 2b sends a handover request to the target eNodeB 2c, e.g. over the X2 interface.

In box indicated at reference numeral 105, the target eNodeB 2c performs an admission control, comprising e.g. the target eNodeB 2c configuring the required resources according to information received from the source eNodeB 2b in the handover request.

At arrow indicated at reference numeral 106, after the admission control, the target eNodeB 2c sends a handover request acknowledgment to the source eNodeB 2b.

At arrow indicated at reference numeral 107, the source eNodeB 2b sends a sequence number (SN) status transfer message to the target eNodeB 2c to convey e.g. uplink Packet Data Convergence Protocol (PDCP) SN UE status.

At box indicated at reference numeral 108, the source eNodeB 2b may optionally start forwarding data intended for the UE 3 to the target eNodeB 2c.

At arrow indicated at reference numeral 109, the source eNodeB 2b sends an RRC connection reconfiguration message to the UE 3, comprising e.g. parameters, measurement configurations, etc. enabling the UE 3 to connect to the target eNodeB 2c cell. This message also comprises a handover command.

At arrow indicated at reference numeral 110, the UE 3 initiates, in this example, a contention free random access (CFRA) by transmitting, to the target eNodeB 2c cell, a CRFA random access preamble. Another possible option in 3GPP is to use a contention based random access (CBRA).

At arrow indicated at reference numeral 111, the target eNodeB 2c responds with an MAC random access response, comprising uplink allocation and timing advance (TA).

At arrow indicated at reference numeral 112, the UE sends an RRC connection reconfiguration complete to the target eNodeB 2c, confirming handover and indicating that the handover procedure is completed for the UE 3. This message comprising the handover complete ends the handover procedure.

The handover process referred to in relation to FIG. 5 may have any of the handover related events described with reference to FIG. 6 as starting point and endpoint. The handover process may have the time duration between any two events of the handover process described with reference to FIG. 6. For instance, the handover process may begin upon the A3 event being triggered (arrow 102) and end when the handover is completed (arrow 112) or some time period after being completed, e.g. controlled by a timer, or begin upon the A3 event being triggered and received by the eNodeB 2b and end upon the handover request being acknowledged by the target node 2c (arrow 106). The handover process may begin later, e.g. it may begin upon the source node 2b sending a handover request to the target node 2c (arrow 104) and end upon the source node 2b sending the RRC connection reconfiguration message to the UE 3. The handover process may thus be set to a number of different durations measured in time.

Figure 7:
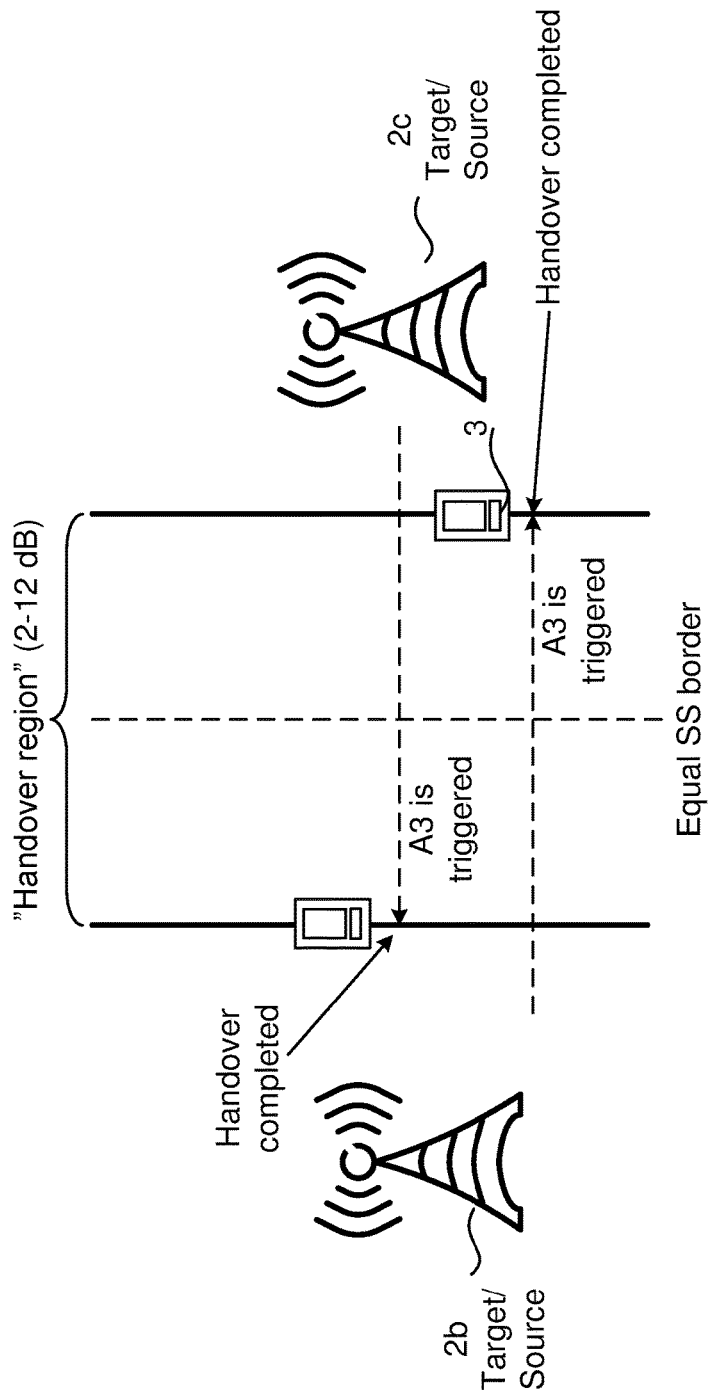
FIG. 7 illustrates a handover situation.

FIG. 7 illustrates a handover situation. A physical (geographical) handover region is indicated as a region between two vertical solid lines. The dashed line, "Equal SS border", indicates a border at which the UE 3 (moving in the handover region) experiences equal signal strength to both a cell controlled by a first access node 2b and a cell controlled by a second access node 2c. The UE 3 may initially have e.g. the first access node 2b as the serving node and the handover process may for instance be triggered when the signal strength to a cell controlled by the second access node 2c becomes more than a particular, typically predefined (configured), threshold value (handover margin) higher than signal strength to its currently serving cell, controlled by the first access node 2b. As a particular example, a handover margin of about 1-6 dB, may be set, i.e. a margin for when the signal strength to the target cell becomes a threshold value higher than the signal strength to the source cell may be between 1 dB and 6 dB, which translates to a handover region of about 2-12 dB (as the UE 3 can move in both directions between the cells of the access nodes 2b, 2c as illustrated by the horizontal dashed lines). Another particular example is a handover margin between 2-4 dB, which corresponds to a handover region of about 4-8 dB.

The handover process may, as mentioned earlier, start e.g. when an A3 event is triggered and end when the handover is complete. The time elapsed between these two points in the handover process may for instance be in the range of 50-100 ms, although it is noted that this is dependent on the particular case at hand. The handover process, during which time period the transmission power is increased, therefore translates into a negligible range in terms of dB. That is, the transmission power is increased for such short duration that the impact on the radio environment is minimized, i.e. the added interference from this transmission power increase towards other users is negligible.

As a particular example, a UE moving at pedestrian speed in the border region between two macro cells may be in the handover region for a time period in the order of minutes, whereas the described handover process typically completes in split-second time. Hence, elevating the power of scheduling assignments during the handover process can easily be in the order of 100 to 1000 times more efficient in terms of generated interference than e.g. simply elevating the power when the UE is in the handover region (during its entire duration therein).

Figure 8:
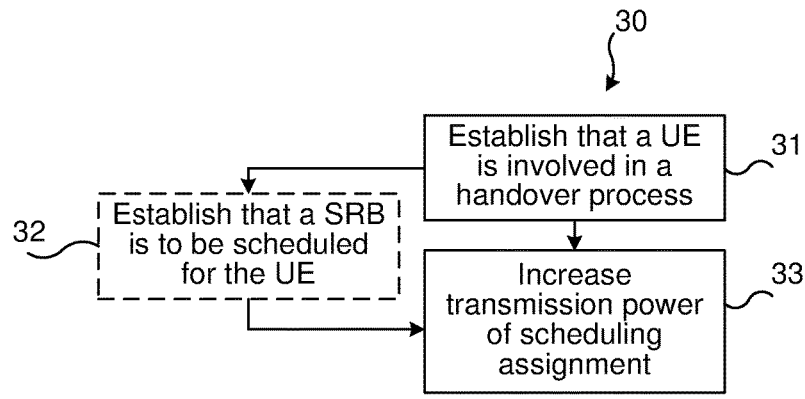
FIG. 8 illustrates a flow chart over steps of a method in a system in accordance with the present disclosure.

The various embodiments and features that have been described may be combined in different ways, examples of which are provided next, with reference first to FIG. 8.

FIG. 8 illustrates a flow chart over steps of a method in a communication system 1 in accordance with the present disclosure. A method 30 relating to handover in a communication system 1 is provided. The handover that is performed may be a handover between cells controlled by different network nodes 2b, 2c or between cells controlled by a single network node.

The method 30 comprises establishing 31 that a communication device 3 is involved in a handover process from a first cell C1 to a second cell C2. For instance, it may be established that the communication device 3 is involved in a handover process by establishing that an event A3 triggered measurement report is received from the communication device 3. Examples of when the handover process starts (and ends) have been given earlier, and e.g. any of the messages of the handover process may be used to establish that the communication device 3 is in the handover process.

The method 30 comprises increasing 33 transmission power of a scheduling assignment specific for the communication device 3. In particular, in response to having established that a particular communication device 3 is in a handover process, the transmission power of a scheduling assignment pointing to resources may be increased, i.e. a power increase for a few particular CCEs.

The method provides an improved robustness for handover-related scheduling assignments in an interference limited part of a radio access network, by increasing the transmission power of the handover related scheduling assignment only during a short duration and/or for some frequencies, e.g. only for some symbols and/or subcarriers of a PDCCH OFDM symbol. Improved robustness for handover is also provided in a coverage limited part of the radio access network by the increase in transmission power. The method thus ensures robustness in handover in high-interference environments as well as in areas having limited coverage. The method further provides the improved handover robustness with retained overall system capacity and in a highly resource efficient way. The method maximizes handover robustness in a highly resource efficient way compared to a more general increase of the system robustness by using more radio resources "just in case".

The method 30 may be implemented in a single network node 2b of the communication system 1, for instance in the currently serving radio access node 2b. In other embodiments, the method 30 may be implemented in a distributed fashion, wherein e.g. the establishing that the communication device 3 is in a handover process is performed in a network node such as the MME 4 or even in a server 8 of an external packet data network, and wherein the increasing of transmission power in response thereto is performed in the serving radio access node.

In an embodiment, the method 30 comprises, prior to the increasing 33 transmission power, establishing 32 that a signaling radio bearer is to be scheduled for the communication device 3. In response to this establishing 32, the transmission power may hence be increased only for signaling radio bearers, and not for data signaling bearers. Also this embodiment reduces the risk of any interference adversely affecting other users being created by the transmission power increase.

In an embodiment, the establishing 31 that the communication device 3 is in handover process comprises receiving (e.g. in the serving radio access node), from the communication device 3, a measurement report comprising an indication on signal strength to the second cell C2 (e.g. controlled by a second network node 2c) being more than a predefined threshold higher than signal strength to the first cell C1 (e.g. controlled by a first network node 2b). This measurement report may be a trigger that the handover process has begun and hence that the transmission power should be increased in response thereto.

In various embodiments, the establishing 31 comprises one or more of: establishing that a handover decision has been made in a first network node 2b controlling the first cell C1, establishing that a handover admission control has been made in a second network node 2c controlling the second cell C2, establishing that data for the communication device 3 is being forwarded from a first network node 2b controlling the first cell C1 to a second network node 2c controlling the second cell C2, or establishing that a first network node 2b controlling the first cell C1 has transmitted a radio connection reconfiguration message to the communication device 3. The handover process may be set to start upon various different events occurring, which enables the time period during which the transmission power is increased to be varied.

In an embodiment, the increasing 33 transmission power comprises increasing the transmission power of at least one control channel element, CCE, specific for the communication device 3 during a specified time interval. This increasing 33 is performed in response to the establishing 31 that the communication device 3 is in handover process and possibly in response to the establishing 32 that an SRB is to be scheduled for the communication device 3. The time interval may for instance be from a first handover event of the handover process to a second handover event of the handover process, as described and exemplified earlier. The transmission power of the at least one CCE specific for the communication device 3 is higher than the transmission power of CCEs for the communication device 3 outside the time interval. Stated differently, the transmission power of signaling to the communication device 3 before the handover process starts and after the handover process ends is not as high as during the handover process.

In various embodiments, the scheduling assignment specific for the communication device 3 relates to a handover command of a signaling radio bearer. The transmission power of scheduling assignment CCEs pointing to the physical downlink shared channel (PDSCH) comprising the handover command may be increased.

In an embodiment, the increasing 33 transmission power of a scheduling assignment specific for the communication device 3 comprises increasing transmission power of only part of a physical downlink control channel, PDCCH, orthogonal frequency division multiplexing, OFDM, symbol.

In a variation of the above embodiment, the transmission power is increased for only a part of the PDCCH OFDM symbol by increasing the transmission power for only some of a set of subcarriers of the PDCCH OFDM symbol. The PDCCH OFDM symbol comprises 12 subcarriers, or equivalently 12 resource elements (REs), which REs in turn may be identified by one subcarrier in frequency domain and one OFDM symbol in time domain. The transmission power may be increased for only a few such REs (or equivalently a few subcarriers of the OFDM symbol), e.g. for REs carrying scheduling assignments, i.e. one or more CCEs of the PDCCH pointing at specific resources intended for the communication device 3. For example, the transmission power of CCEs for SRBs may be increased, or more specifically the transmission power of CCEs pointing at the handover command for the communication device 3.

For the case of LTE, the scheduling assignment specific for the communication device 3 is carried on a set of control channel elements, CCEs, of a physical downlink control channel, PDCCH.

Figure 9:
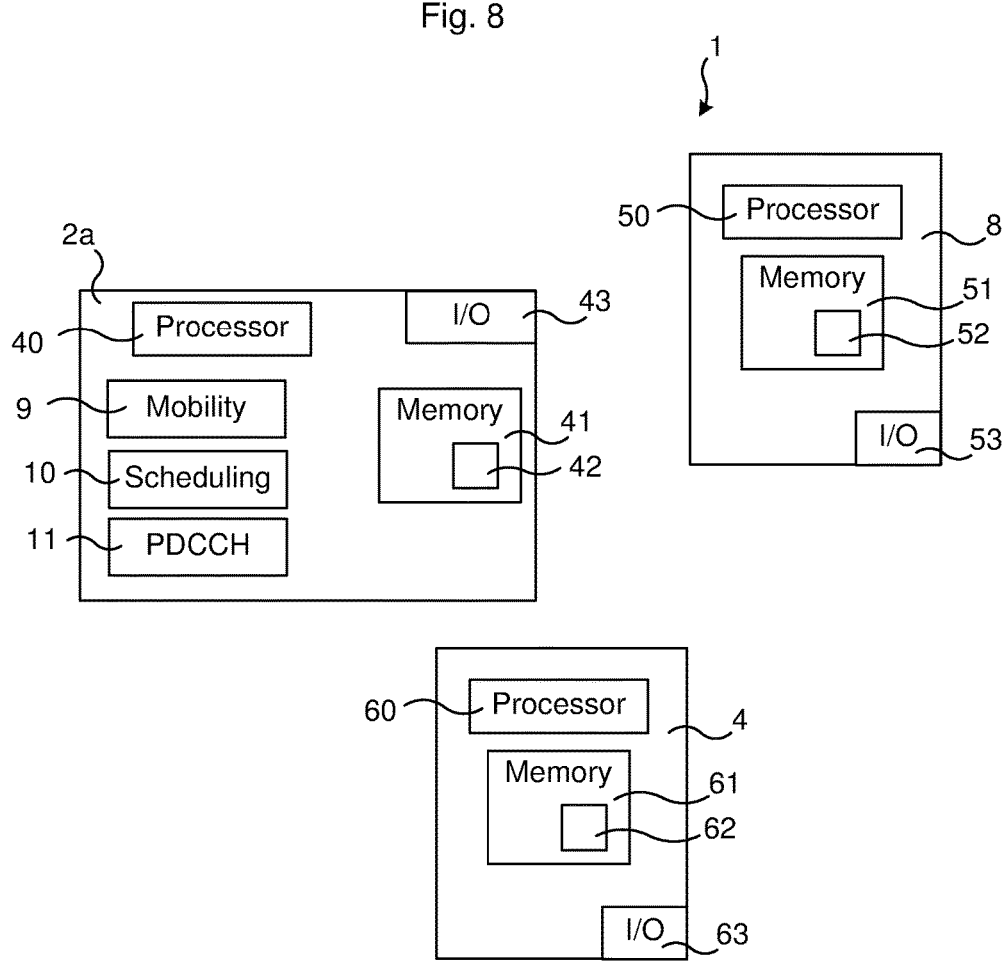
FIG. 9 illustrates schematically a system comprising one or several network nodes and means for implementing embodiments of the present disclosure.

FIG. 9 illustrates schematically a communication system 1 comprising one or several network nodes 2a, 8, 4 and means for implementing embodiments of the present disclosure. The various embodiments of the method 30 as described e.g. in relation to FIG. 8 may be implemented in a single network node, e.g. in the radio access node 2a, 2b, 2c. That is, the method 30 is executed in a single network node. In other embodiments, the method 30 may be implemented in the communication system 1 in a distributed fashion, wherein different functions/steps are performed by different devices or network nodes. As a particular example, some steps may be performed in the radio access node 2a, 2b, 2c while others are performed in the MME 4 or in a server 8 of a cluster of servers (e.g. Internet).

The communication system 1 described with reference to FIG. 4 is illustrated in a more schematic way in FIG. 9. In FIG. 9, three network nodes are shown, in particular a radio access node 2a (eNodeB), an MME 4 and a server 8 of the Internet. It is however noted that other, additional or fewer network nodes may be involved in executing the method 30.

Each of the network nodes 2a, 4, 8 or network devices illustrated in FIG. 9 comprises a respective processor 40, 60, 50. Each of the processors 40, 60, 50 may comprise any combination of one or more of a central processing unit (CPU), multiprocessor, microcontroller, digital signal processor (DSP), application specific integrated circuit etc. capable of executing software instructions stored in a respective memory 41, 61, 51 which can thus be a respective computer program product 41, 61, 51. The processors 40, 60, 50 can be configured to execute any of the various embodiments of the method for instance as described in relation to FIG. 8, or parts of the steps, i.e. wherein different steps of the method 30 are executed in different network nodes.

Each memory 41, 61, 51 can be any combination of read and write memory (RAM) and read only memory (ROM), Flash memory, magnetic tape, Compact Disc (CD)-ROM, digital versatile disc (DVD), Blu-ray disc etc. Each memory 41, 61, 51 may also comprise persistent storage, which, for example, can be any single one or combination of magnetic memory, optical memory, solid state memory or even remotely mounted memory.

Each network node 2b, 4, 8 may also comprise a respective input/output device 43, 63, 53 (indicated by I/O in the FIG. 9) for communicating with other network nodes and devices in the communication system. Each of the input/output devices 43, 63, 53 may for instance comprise a communication interface. The input/output devices 43, 63, 53 may e.g. communicate over a wired connection with other network node directly or via intermediate network nodes.

In FIG. 9, the radio access node 2a is illustrated as comprising the earlier described (refer to FIGS. 4 and 5) logical parts 9, 10, 11: mobility management 9, scheduling management 10 and PDCCH management 11. It is noted that the location of these logical parts 9, 10, 11 may, in other embodiments, be distributed among the different network nodes or be located in another network node than the radio access node 2a.

A communication system 1 is provided. The communication system 1 is configured to:
establish that a communication device 3 is involved in a handover process from a first cell C1 to a second cell C2, and
increase transmission power of a scheduling assignment specific for the communication device 3.

The communication system 1 may be configured to perform the above steps e.g. by comprising one or more processors 40, 60, 50 and one or more memories 41, 61, 51, the memories 41, 61, 51, each containing instructions executable by the processors 40, 60, 50, whereby the memories 41, 61, 51 is operative to perform the steps.

In an embodiment, the communication system 1 is configured to, prior to the increasing transmission power, establish that a signaling radio bearer is to be scheduled for the communication device 3.

In an embodiment, the communication system 1 is configured to establish by receiving, from the communication device 3, a measurement report comprising an indication on signal strength to the second cell C2 being more than a predefined threshold higher than signal strength to the first cell C1.

In various embodiments, the communication system 1 is configured to establish by one or more of: establishing that a handover decision has been made in a first network node 2b controlling the first cell C1, establishing that a handover admission control has been made in a second network node 2c controlling the second cell C2, establishing that data for the communication device 3 is being forwarded from a first network node 2b controlling the first cell C1 to a second network node 2c controlling the second cell C2, or establishing that a first network node 2b controlling the first cell C1 has transmitted a radio connection reconfiguration message to the communication device 3.

In an embodiment, the communication system 1 is configured to increase transmission power by increasing the transmission power of at least one control channel element, CCE, specific for the communication device 3 during a time interval from a first handover event of the handover process to a second handover event of the handover process, wherein the transmission power of the at least one CCE specific for the communication device 3 is higher than the transmission power of CCEs for the communication device 3 outside the time interval.

In an embodiment, the scheduling assignment specific for the communication device 3 relates to a handover command of a signaling radio bearer.

In an embodiment, the communication system 1 is configured to increase transmission power of a scheduling assignment specific for the communication device 3 comprises increasing transmission power of only part of a physical downlink control channel, PDCCH, orthogonal frequency division multiplexing, OFDM, symbol.

In a variation of the above embodiment, the communication system 1 is configured to increase the transmission power for only a part of the PDCCH OFDM symbol by being configured to increase the transmission power for only some of a set of subcarriers of the PDCCH OFDM symbol.

In an embodiment, the transmission power is increased only for the scheduling assignment scheduling the RRC message that comprises the handover command. Increasing the transmission power only for these OFDM symbols and subcarrier(s) provides a highly advantageous embodiment by ensuring that the handover command reaches the intended communication device 3 and hence a successful handover while causing a minimum of interference to other users.

The present disclosure also encompasses computer program products 41, 51, 61 comprising a computer program 42, 52, 62 for a communication system 1 and a computer readable means on which the computer program 42, 52, 62 is stored. Each computer program 42, 52, 62 comprises computer program code, which, when executed on at least one processor in the communication system 1 causes the communication system 1 to perform the method 30 according to any of the described embodiments thereof.

The computer program products 42, 62, 52, or the memories, thus comprise instructions executable by a processor 40, 60, 50. Such instructions may be comprised in a computer program, or in one or more software modules or function modules.

Means are provided, e.g. function modules, that can be implemented using software instructions such as computer program executing in a processor and/or using hardware, such as application specific integrated circuits, field programmable gate arrays, discrete logical components etc., or any combination thereof.

In particular, a communication system is provided. The communication system comprises first means for establishing that a communication device is involved in a handover process from a first cell to a second cell. Such first means may comprise processing circuitry adapted to detect an event triggering the handover process.

The communication system comprises second means for increase transmission power of a scheduling assignment specific for the communication device. Such second means may comprise processing circuitry for performing such transmission power increase.

In summary, a core essence of the present disclosure is to increase the power on scheduling assignments to UEs involved in handover. As has been described, this can be done with more or less precision. Basic solutions can be to apply increased power for all scheduling assignments to an UE involved in handover or to apply increased power for all SRB-related Scheduling Assignments. However, a more advanced and resource efficient approach is to combine several criteria. That could mean to combine information for each UE regarding handover and bearer type. In this case increased power would only be used when sending Scheduling Assignments for a UE which is in handover and have an SRB to be scheduled.

The target eNB that receives the UE can also apply increased power for all SRB-related scheduling assignments just after the handover.

To use increased power for SRBs in general, or, for any scheduling assignment during the handover procedure would still result in a substantial waste of power and as a consequence increased interference in the surrounding cells. However, by limiting the number of scheduling assignments to be protected, for example as has been described, the benefit in handover performance can be achieved while the additional interference is limited.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method relating to handover in a communication system, the method comprising:
    establishing that a communication device is involved in a handover process from a first cell to a second cell; and
    increasing transmission power of a scheduling assignment specific for the communication device, wherein prior to the increasing transmission power, establishing that a signaling radio bearer is to be scheduled for the communication device,
    wherein the scheduling assignment specific for the communication device relates to a handover command of a signaling radio bearer and in response to the establishing that the signaling radio bearer is to be scheduled for the communication device, increasing the transmission power for the signaling radio bearer,
    wherein the increasing transmission power comprises increasing the transmission power of at least one control channel element (CCE) specific for the communication device during a time interval from a first handover event of the handover process to a second handover event of the handover process, and
    wherein the transmission power of the at least one CCE specific for the communication device is higher than the transmission power of CCEs for the communication device outside the time interval.

2. The method of claim 1, wherein the establishing comprises receiving, from the communication device, a measurement report comprising an indication on signal strength to the second cell being more than a predefined threshold higher than signal strength to the first cell.

3. The method of claim 1, wherein the establishing comprises at least one of:
    establishing that a handover decision has been made in a first network node controlling the first cell;
    establishing that a handover admission control has been made in a second network node controlling the second cell;
    establishing that data for the communication device is being forwarded from the first network node controlling the first cell to the second network node controlling the second cell; or
    establishing that the first network node controlling the first cell has transmitted a radio connection reconfiguration message to the communication device.

4. The method of claim 1, wherein the increasing transmission power comprises increasing transmission power of only part of a physical downlink control channel, (PDCCH) orthogonal frequency division multiplexing (OFDM) symbol.

5. The method of claim 4, wherein the transmission power is increased for only a part of the PDCCH OFDM symbol by increasing the transmission power for only some of a set of subcarriers of the PDCCH OFDM symbol.

6. A non-transitory computer readable recording medium storing a computer program product for controlling a communication system, the computer program product comprising software instructions which, when run on processing circuitry of the communication system, causes the communication system to:
    establish that a communication device is involved in a handover process from a first cell to a second cell; and
    increase transmission power of a scheduling assignment specific for the communication device, wherein prior to the increasing transmission power, establishing that a signaling radio bearer is to be scheduled for the communication device,
    wherein the scheduling assignment specific for the communication device relates to a handover command of a signaling radio bearer and in response to the establishing that the signaling radio bearer is to be scheduled for the communication device, increasing the transmission power for the signaling radio bearer,
    wherein the increasing transmission power comprises increasing the transmission power of at least one control channel element (CCE) specific for the communication device during a time interval from a first handover event of the handover process to a second handover event of the handover process, and
    wherein the transmission power of the at least one CCE specific for the communication device is higher than the transmission power of CCEs for the communication device outside the time interval.

7. A communication system, comprising:
processing circuitry;
memory containing instructions executable by the processing circuitry whereby the communication system is operative to:
  establish that a communication device is involved in a handover process from a first cell to a second cell; and
  increase transmission power of a scheduling assignment specific for the communication device, wherein prior to the increasing transmission power, establishing that a signaling radio bearer is to be scheduled for the communication device,
  wherein the scheduling assignment specific for the communication device relates to a handover command of a signaling radio bearer and in response to the establishing that the signaling radio bearer is to be scheduled for the communication device, increasing the transmission power for the signaling radio bearer,
  wherein the increasing the transmission power comprises increasing transmission power of only part of a physical downlink control channel (PDCCH) orthogonal frequency division multiplexing (OFDM) symbol.

8. The communication system of claim 7, wherein the instructions are such that the communication system is operative to establish that the communication device is involved in the handover process by receiving, from the communication device, a measurement report comprising an indication on signal strength to the second cell being more than a predefined threshold higher than signal strength to the first cell.

9. The communication system of claim 7, wherein the instructions are such that the communication system is operative to establish that the communication device is involved in the handover process by at least one of:
  establishing that a handover decision has been made in a first network node controlling the first cell;
  establishing that a handover admission control has been made in a second network node controlling the second cell;
  establishing that data for the communication device is being forwarded from the first network node controlling the first cell to the second network node controlling the second cell; or
  establishing that the first network node controlling the first cell has transmitted a radio connection reconfiguration message to the communication device.

10. The communication system of claim 7:
  wherein the instructions are such that the communication system is operative to increase transmission power by increasing the transmission power of at least one control channel element (CCE) specific for the communication device during a time interval from a first handover event of the handover process to a second handover event of the handover process;
  wherein the transmission power of the at least one CCE specific for the communication device is higher than the transmission power of CCEs for the communication device outside the time interval.

11. The communication system of claim 7, wherein the instructions are such that the communication system is operative to increase the transmission power for only a part of the PDCCH OFDM symbol by increasing the transmission power for only some of a set of subcarriers of the PDCCH OFDM symbol.

* * * * *